United States Patent [19]
Doyle

[11] 4,183,669
[45] Jan. 15, 1980

[54] DUAL BEAM FOURIER SPECTROMETER
[75] Inventor: Walter M. Doyle, Laguna Beach, Calif.
[73] Assignee: Laser Precision Corporartion, Utica, N.Y.
[21] Appl. No.: 830,576
[22] Filed: Sep. 6, 1977
[51] Int. Cl.² .................................................. G01B 9/02
[52] U.S. Cl. .................................. 356/346; 356/307
[58] Field of Search .................... 356/106 S, 307, 346

[56] References Cited
U.S. PATENT DOCUMENTS

| | | | |
|---|---|---|---|
| 3,684,379 | 8/1972 | Girard | 356/106 S |
| 3,753,619 | 8/1973 | Thorpe et al. | 356/106 S |
| 4,009,962 | 3/1977 | Lauer et al. | 356/106 S |
| 4,081,215 | 3/1978 | Penny et al. | 356/75 |
| 4,084,907 | 4/1978 | Pinard et al. | 356/106 S |

OTHER PUBLICATIONS
"Polarization Fourier Spectrometer for Astronomy;" A'Hearn et al.; Applied Optics; vol. 13, #5; May 74, pp. 1147-1157.

Primary Examiner—Vincent P. McGraw
Attorney, Agent, or Firm—Thomas J. Plante

[57] ABSTRACT

A dual beam Fourier-type spectrometer is disclosed incorporating distinct sample and reference beams which enter the Michelson-type interferometer on the same side of the beam splitter and propagate at slightly different angles through the interferometer. The portions of both beams which emerge from the side of the beam splitter opposite the input side are directed to two separate optical detectors, the outputs of which are electronically subtracted. In a preferred embodiment, the interferometer is of the refractively scanned type, wherein the increased field-of-view facilitates the use of beams having different propagation angles.

21 Claims, 3 Drawing Figures

DUAL BEAM FOURIER SPECTROMETER

BACKGROUND OF THE INVENTION

This invention relates to spectroscopy and particularly to Fourier transform spectroscopy, in which a Michelson interferometer is generally used. The pattern traced out, as the length of one interferometer arm is scanned, is the Fourier transform of the wavelength spectrum.

This invention more specifically relates to a "dual beam" Fourier spectrometer. For the present discussion, the term "dual beam" will refer to an optical system incorporating a Michelson interferometer and having two distinct optical paths in either the input or output of the interferometer (or both). In a dual beam Fourier spectrometer, these paths are used to simultaneously obtain (a) data from a material sample under study and (b) data for reference purposes from a sample-free region. This use of the term dual beam should be distinguished from the use of the same term to refer to the fact that the Michelson interferometer is itself a "dual beam" system, i.e., an interferometer in which light is separated by the beamsplitter into two beams and then recombined.

"Dual beam" spectroscopy is the subject of Chapter 7 of the book "Chemical Infrared Fourier Transform Spectroscopy" by Griffiths, published by John Wiley & Sons.

The importance of dual beam Fourier spectroscopy (FS) stems from the fact that the interferogram corresponding to a broad radiation spectrum will have a very high peak value (central maximum) when the path lengths of the two interferometer arms are equal (see Griffiths, FIG. 1.11). In order to electronically perform the Fourier transformation required to obtain the spectrum, it is first necessary to digitize the interferogram, and the cost of Analog-to-Digital (A/D) converters rises rapidly with increased resolution. As discussed by Griffiths (Chapter 2, Sec. II), the resolution required of the input A/D converter will normally be much greater than that of the resulting spectrum.

The dual beam approach can be applied when the Fourier spectrometer is being used to study the spectral characteristics of materials in either transmission or reflection. For the discussion which follows, we will assume the transmission case.

Griffiths describes several systems that have been proposed for dual beam Fourier spectrometry. The simplest example is the system of Burroughs and Chamberlain (B and C), FIG. 7.7. This system uses a conventional interferometer with the exception that retro-reflectors are used as interferometer mirrors. This allows the input and output beams to be physically displaced from each other within the interferometer. As a result, the output beam which emerges on the same side of the beamsplitter as the input beam can now be detected. The AC portion of the interferogram observed in this beam has the opposite polarity from that observed in the beam emergent from the opposite side of the beamsplitter. If both beams are detected and the resultant electric signals added, the two interferograms will cancel, giving no AC signal as long as the two optical paths and detector responses are identical.

In using a dual beam Fourier Spectrometer of the type just described, a sample to be studied is introduced into the path of one of the beams (the sample beam). The absorption characteristics of the sample alter the characteristics of the sample beam interferogram so that it is no longer exactly the inverse of the reference beam interferogram. As a result, the summed output signal will exhibit a net interferogram which is due only to the absorption properties of the sample. This interferogram will generally have a much smaller central maximum than the single beam interferogram, but can still be processed to yield the absorption spectrum of the sample.

According to Griffiths, the system described above is probably the preferred approach to dual beam Fourier spectrometry. However, it has the disadvantage of requiring large area retro-reflectors and a beamsplitter with high optical quality over the full aperture. And, needless-to-say, precise control of the motion of a large retro-reflector is difficult. In addition, the fact that the two beams emerge from opposite sides of the beamsplitter means that they will be affected in different ways by the properties of the beamsplitter. Of particular significance is the effect of the second (low reflectance) surface of the beamsplitter. The resultant imperfect matching of the two beams can be quite significant. This problem is recognized by Griffiths (see pages 177 and 183) who states that it may, in part, be caused by oxides of germanium on the upper surface of the beamsplitter (page 177).

In addition to the design described above, Griffiths discusses several other dual beam spectrometers, some of which have the separated beams in the source portion of the system, rather than the detector portion. All of these systems share the common feature that the two beams either emerge from or enter opposite sides of the beamsplitter. They thus share the beamsplitter asymmetry problem mentioned above.

SUMMARY OF THE INVENTION

The present invention eliminates the problem of imperfect beam matching by having both beams of the dual beam spectroscope emerge (and reach the radiation detecting means) on the same side of the beamsplitter, preferably the side of the beamsplitter opposite the entering radiation. It is desirable that the radiation source propagate the dual beams through the interferometer at slightly different angles.

In a preferred version of the present invention, the concepts just discussed are combined with a "refractively scanned interferometer," of the type first disclosed in my prior application Ser. No. 790,457, filed Apr. 25, 1977. Because the refractive scanning concept solves certain problems inherent in the use of dual beam spectrometers, this combination provides important synergistic benefits.

DETAILED DESCRIPTION OF SPECIFIC EMBODIMENTS

Figure 1:
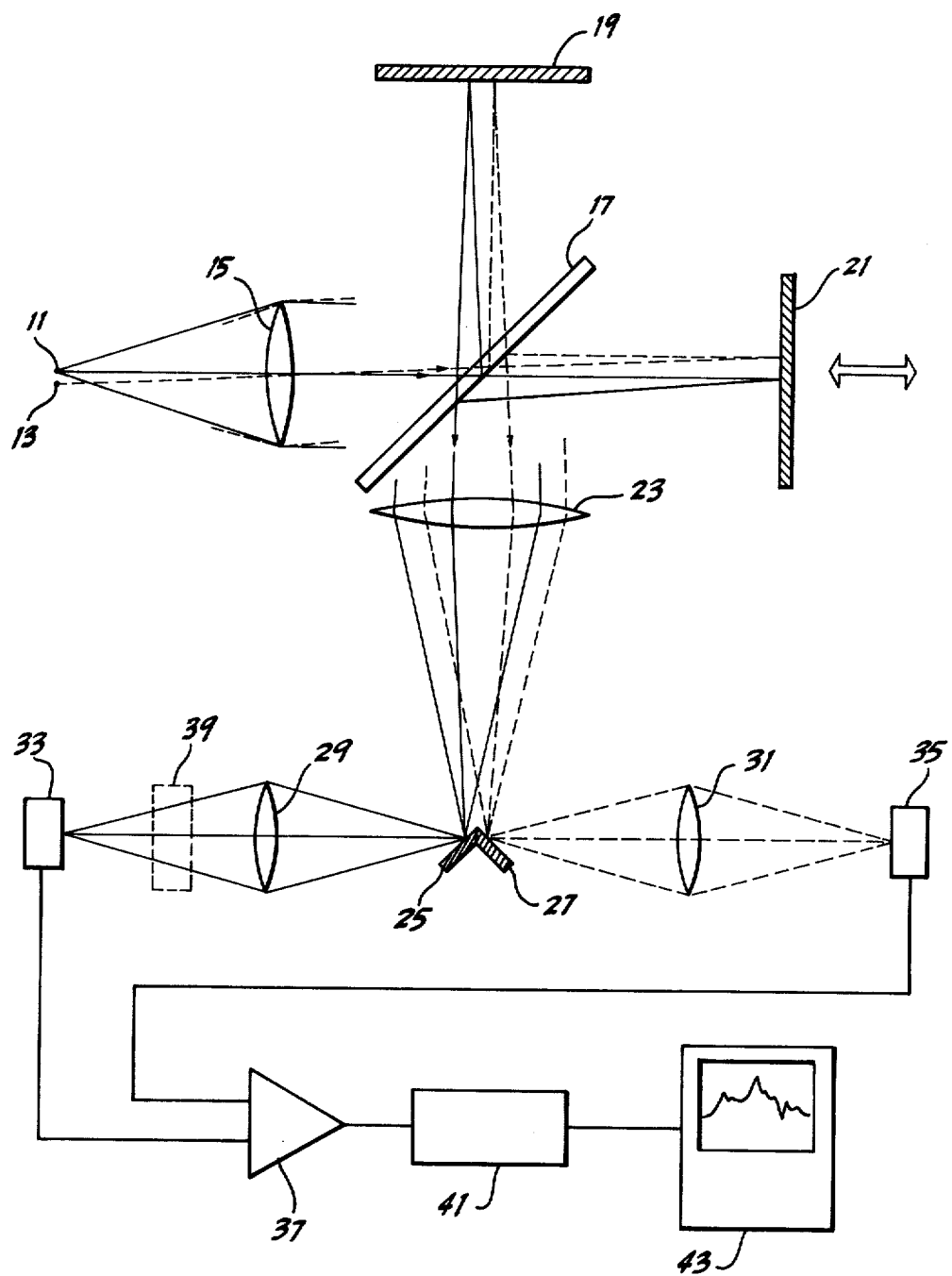
FIG. 1 is a diagrammatic showing of a spectrometer wherein the optical, or interferometer, portion illustrates my improved dual beam system.

FIG. 1 illustrates one embodiment of my invention. Radiation from two adjacent sources 11 and 13, or from adjacent areas on a single source, is collimated by means of lens 15, or other suitable optical means, and is directed to beamsplitter 17 of a Michelson interferometer. Radiation from source 11 is represented in the figure by solid lines, and radiation from source 13 is represented by dashed lines. After being split and subsequently reflected by fixed and moving mirrors 19 and 21, the radiation is recombined at the beamsplitter. The portion emerging from the side of the beamsplitter opposite the input side is imaged by optical means 23. The term "input side" refers to the side of the beamsplitter where the radiation source is located.

Since the two radiation source areas 11 and 13 are spatially distinct, the corresponding radiation beams will propagate at slightly different angles through the interferometer and will be imaged in separate adjacent areas. The radiation in these two image areas is redirected by mirrors 25 and 27 and imaged by optical means 29 and 31 on detectors 33 and 35. The outputs of the two detectors are fed into a difference amplifier 37.

If a sample to be analyzed 39 is interposed in one of the spectrometer beams, an interferogram will appear at the output of the difference amplifier. This can be processed by a Fourier transform computer 41 and fed to a suitable display means 43 to give the absorption spectrum of the sample.

A significant distinction between the system of FIG. 1 and the previous dual beam Fourier spectrometer systems is that the portions of the radiation corresponding to the reference and sample beams, respectively, follow paths which enter the interferometer on the same side of the beamsplitter and which emerge on the opposite side of the beamsplitter. As a result, they are affected in approximately the same way by the beamsplitter characteristics. Unlike the earlier systems, my design gives rise to sample and reference interferograms having the same polarity. In order to obtain cancellation, it is thus necessary to take the difference between the signals obtained from the two detectors rather than the sum.

Figure 2:
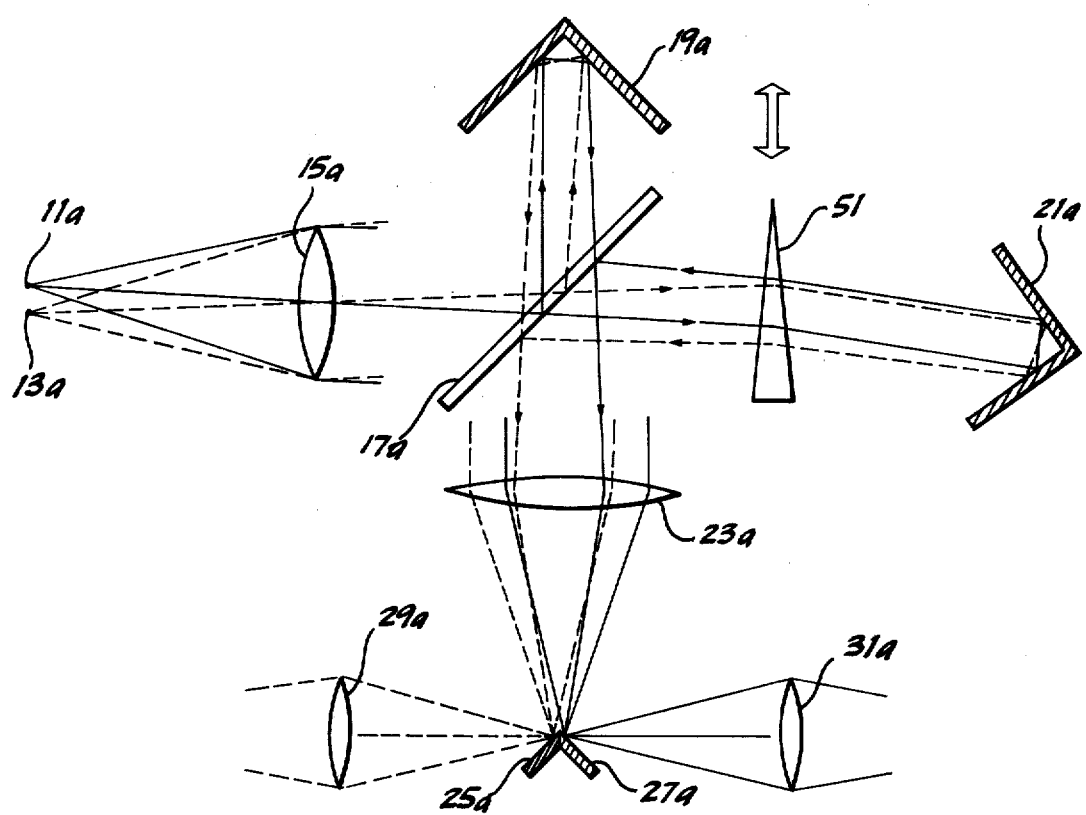
FIG. 2 is a diagrammatic showing of the optical portion of the preferred system utilizing refractive scanning.

A preferred embodiment of the optical portion of my invention is shown in FIG. 2. This embodiment uses the angular beam differentiation approach of FIG. 1 combined with a refractively scanned interferometer such as that described in my earlier patent application Ser. No. 790,457). The embodiment in FIG. 2 differs from FIG. 1 in two respects. First, retro-reflectors are used as the interferometer mirrors, rather than flat reflectors. Second, both reflectors are stationary, and scanning is accomplished by the displacement of a wedge-shaped refractive element across one of the interferometer arms.

In FIG. 2, the wedge-shaped refractive element is designated by the numeral 51. The two radiation sources are 11a and 13a, the collimating lens is 15a, and the beamsplitter is 17a. The two reflectors are retro-reflectors 19a and 21a, both of which are stationary. Scanning is accomplished by moving wedge-shaped element 51 across the radiation path to vary the optical path length in one arm of the interferometer.

The advantages of refractive scanning have been discussed in my earlier application. Combining this type of scanning with dual beam operation presents some unique design considerations. In particular, a review of the various earlier dual beam systems reveals that most of them can not be used with retro-reflectors, since they are so designed as to require input and output beams which travel at different angles within the interferometer. A retro-reflector will not accommodate such an arrangement because it automatically returns the beam on a path parallel to its direction of incidence.

Of the previous dual beam systems with which I am familiar, only that of Burroughs and Chamberlain is designed for use with retro-reflectors. However, this system has the disadvantage of requiring the input and output beams to be transversely displaced from each other and, in fact, to be non-overlapping at the beamsplitter. This necessitates the use of a beamsplitter and retro-reflectors having twice the width of the usable aperture. It can thus substantially increase the criticality, and hence cost, of the optical components. In our case, it would also require an increase in the size of the moving refractive wedge.

In the design shown in FIG. 2, the two beams are differentiated by angle of propagation. Since no attempt is made to detect the portions of the beams emerging on the input side of the beam-splitter, the input and output beams can be overlapping, and a significant reduction in required component size will result. As shown, the beams are completely overlapping at the input collimating element. As they travel through the interferometer, they partially separate due to their different propagation angles.

An optimum arrangement would require maximum beam overlap at some point within the interferometer, such as at the beamsplitter. This can be accomplished by placing an area-defining aperture at the beamsplitter. The beam displacement then is equally balanced between the input and output arms, and the overall size requirements are reduced.

Figure 3:
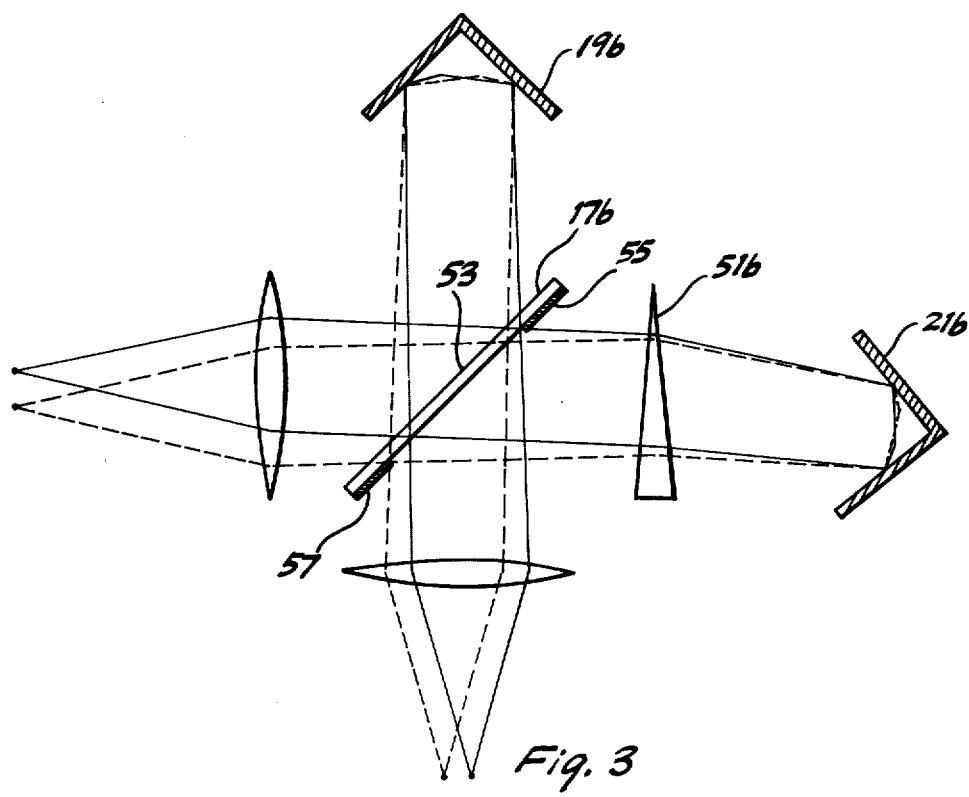
FIG. 3 is a diagrammatic showing of means for obtaining the optimum arrangement of radiation in a dual beam system, wherein the two beams have maximized overlap at the beamsplitter.

Such an area-defining aperture is illustrated in FIG. 3. The beamsplitter 17b has an aperture area 53, defined by radiation-blocking areas 55 and 57 located along the upper and lower ends of the beamsplitter. The aperture 53 restricts the allowed combination of propagation angles and lateral positions, so as to result in the symmetrical configuration of limiting rays illustrated in the figure. This balances the displacement between the input and output optics, and thus provides the maximum overlap of the two beams within the interferometer.

A possible objection to the use of angular differentiation for dual beam operation arises from the fact that the angular field-of-view of a Fourier spectrometer has inherent limitations. If the available field-of-view must be shared between two beams, the throughput (or total light transmitting ability) of each beam will be reduced. This objection is substantially reduced by the embodiment of FIG. 2, since the use of refractive scanning can be shown to result in an increase in the angular field-of-view approximately in proportion to the index of refraction of the refractive element. This increase is sufficient that, even with angular beam differentiation, the available throughput will exceed that which can be effectively utilized by many infrared detectors, i.e., the throughput will be detector limited.

We have seen that the embodiment of FIG. 2 takes advantage of the large field-of-view of refractive scanning while minimizing the sizes of the various optical components by maximizing the overlap of the sample and reference beams. It also shares the advantage of the embodiment in FIG. 1, resulting from the fact that the two beams emerge from the same side of the beamsplitter and hence are affected in the same way by its optical characteristics.

The following claims are intended not only to cover the specific embodiments disclosed, but also to cover the inventive concepts explained herein with the maximum breadth and comprehensiveness permitted by the prior art.

What I claim is:

1. In a Fourier transform spectrometer which includes a Michelson-type interferometer having a beamsplitter which divides source radiation between a fixed-length path and a variable-length path, and having reflectors in each of those paths which reflect radiation back to the beamsplitter, the combination of:
   radiation-propagating means for causing dual radiation beams to enter the interferometer on one side of the beamsplitter;
   radiation-detecting means for separately detecting the dual radiation beams as they emerge from the other side of the beamsplitter;
   said dual radiation beams substantially overlapping one another at the beamsplitter and/or the reflectors.

2. The spectrometer of claim 1 which also includes:
   means for electrically subtracting the intensity of one of the separately detected dual radiation beams from the intensity of the other.

3. The spectrometer of claim 1 wherein the dual beams from the radiation-propagating means pass through the interferometer along non-parallel paths.

4. The spectrometer of claim 3 which also includes:
   an area-limiting aperture at the beamsplitter for causing maximum overlap of the dual radiation beams.

5. The spectrometer of claim 1 wherein maximum overlap of the dual radiation beams is caused by an area-limiting aperture at the beamsplitter.

6. The spectrometer of claim 1 which also includes means for spatially separating the dual radiation beams comprising:
   optical focusing means positioned to intercept the dual beams and cause their spatial separation; and
   reflecting means positioned in the image plane of the focusing means to intercept the spatially separated beams, and arranged to direct the beams separately to the radiation-detection means.

7. The spectrometer of claim 1 wherein the radiation-detecting means includes:
   separate detectors for the dual radiation beams which provide simultaneous monitoring of both beams.

8. The spectrometer of claim 7 which further includes:
   radiation focusing and reflecting means for directing the dual radiation beams along spatially separated paths to the respective detectors.

9. That method of analyzing a material sample in a spectrometer which includes an interferometer beamsplitter, which method comprises:
   propagating a sampling radiation through the interferometer and through the material sample, said radiation originating on one side of the beamsplitter;
   propagating a reference radiation through the interferometer at an angle different from the sampling radiation, which reference radiation does not pass through the material sample, said reference radiation originating on the same side of of the beamsplitter as the sampling radiation;
   detecting the sampling radiation as it emerges from the other side of the beamsplitter;
   simultaneously detecting the reference radiation as it also emerges from said other side of the beamsplitter; and
   continuously comparing the detected sampling and reference radiations to determine the radiation variation caused by the presence of the material sample.

10. A dual beam spectrometer comprising:
    a beamsplitter for dividing radiation into two optical paths;
    radiation-propagating means which directs two converging radiation beams along substantially overlapping paths toward one side of the beamsplitter; and
    radiation-detecting means comprising two detectors which detect separately the two radiation beams emerging from the other side of the beamsplitter.

11. The dual beam spectrometer of claim 10 wherein one radiation beam passes through a material sample area, and the other radiation beam passes through a reference area.

12. The dual beam spectrometer of claim 11 wherein the radiation propagating means comprises two radiation sources.

13. The dual beam spectrometer of claim 11 wherein the two radiation beams are derived from adjacent areas of the same radiation source.

14. The dual beam spectrometer of claim 10 which also comprises:
    means for electrically subtracting the output of one detector from the output of the other detector.

15. The dual beam spectrometer of claim 10 which also comprises:
    retro-reflectors located at the end of each optical path taken by the radiation after it leaves the beamsplitter, said retro-reflectors returning said radiation toward the beamsplitter; and
    means for varying the length of one of such optical paths with respect to the other.

16. The dual beam spectrometer of claim 15 wherein the means for varying the length of one optical path comprises a moving refractive element.

17. The spectrometer of claim 16 which also includes means for spatially separating the two radiation beams comprising:
    optical focusing means positioned to intercept the two beams and cause their spatial separation; and
    reflecting means positioned in the image plane of the focusing means to intercept the spatially separated beams, and arranged to direct the beams along separated paths to the two detectors.

18. The dual beam spectrometer of claim 14 which also comprises:
    retro-reflectors located at the end of each optical path taken by the radiation after it leaves the beam-splitter, said retro-reflectors returning said radiation toward the beamsplitter; and
    means for varying the length of one of such optical paths with respect to the other.

19. The dual beam spectrometer of claim 18 wherein the means for varying the length of one optical path comprises a moving refractive element.

20. A dual beam spectrometer, of the type including an interferometer, comprising:
    means for propagating a sampling radiation beam and a reference radiation beam at different angles;

beamsplitting means for dividing both radiation beams into reflected and transmitted beams directed along two interferometer arms;

reflectors defining the end of each interferometer arm and reflecting the beams back toward the beamsplitter, the length of one interferometer arm being variable for scanning purposes;

two detectors located optically on the side of the beam splitter opposite the radiation-propagating means and arranged to simultaneously detect the intensity of the two beams;

means for separating the sample and reference beams on said opposite side of the beamsplitter and directing said beams, respectively, toward the two detectors; and means for electrically subtracting in real time the output of one detector from the output of the other detector to reduce the peak detected signal.

21. The dual beam spectrometer of claim 20 wherein the reflectors are retro-reflectors, and wherein there is included a wedge-shaped refractive element for causing path-length scanning within the interferometer.

* * * * *